(12) United States Patent
Mikami et al.

(10) Patent No.: US 11,459,492 B2
(45) Date of Patent: Oct. 4, 2022

(54) ADHESIVE COMPOSITION HAVING ANTI-FOGGING PROPERTY

(71) Applicant: TOYOBO CO., LTD., Osaka (JP)

(72) Inventors: Tadahiko Mikami, Shiga (JP); Masahito Tanigawa, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 246 days.

(21) Appl. No.: 16/466,679

(22) PCT Filed: Jan. 17, 2018

(86) PCT No.: PCT/JP2018/001127
§ 371 (c)(1),
(2) Date: Jun. 5, 2019

(87) PCT Pub. No.: WO2018/179689
PCT Pub. Date: Oct. 4, 2018

(65) Prior Publication Data
US 2020/0063006 A1  Feb. 27, 2020

(30) Foreign Application Priority Data

Mar. 29, 2017 (JP) .............................. JP2017-065332

(51) Int. Cl.
| | | |
|---|---|---|
| C09J 167/00 | (2006.01) | |
| C09J 7/20 | (2018.01) | |
| C09J 11/06 | (2006.01) | |
| C09J 167/02 | (2006.01) | |
| B65D 65/40 | (2006.01) | |
| C08K 5/06 | (2006.01) | |
| C09J 7/25 | (2018.01) | |

(52) U.S. Cl.
CPC ............ *C09J 167/00* (2013.01); *B65D 65/40* (2013.01); *C09J 7/20* (2018.01); *C09J 11/06* (2013.01); *C09J 167/02* (2013.01); *C08K 5/06* (2013.01); *C08L 2205/025* (2013.01); *C09J 7/255* (2018.01); *C09J 2203/00* (2013.01); *C09J 2301/312* (2020.08); *C09J 2301/408* (2020.08); *C09J 2467/00* (2013.01); *C09J 2467/006* (2013.01)

(58) Field of Classification Search
None
See application file for complete search history.

(56) References Cited

U.S. PATENT DOCUMENTS

| | | | |
|---|---|---|---|
| 4,606,785 A | * | 8/1986 | Zeise ...................... B32B 19/06 156/305 |
| 2005/0013953 A1 | | 1/2005 | Ono et al. |
| 2005/0118412 A1 | | 6/2005 | Peiffer et al. |
| 2014/0065431 A1 | * | 3/2014 | Sakellarides ........... B32B 27/36 428/446 |
| 2017/0225830 A1 | * | 8/2017 | Kashiwakura ..... B65D 17/4012 |

FOREIGN PATENT DOCUMENTS

| | | |
|---|---|---|
| JP | 2004-25825 | 1/2004 |
| JP | 2005-7827 | 1/2005 |
| JP | 2005-145068 | 6/2005 |
| JP | 2006-145912 | 6/2006 |
| JP | 2012-91396 | 5/2012 |
| JP | 5804339 | 11/2015 |
| WO | 2015/046132 | 4/2015 |
| WO | 2017/159650 | 9/2017 |

OTHER PUBLICATIONS

Machine translation of JP 2012091396 A (Year: 2012).*
Machine translation of JP 2006145912 A (Year: 2006).*
International Search Report dated Feb. 13, 2018 in International Application No. PCT/JP2018/001127.

* cited by examiner

*Primary Examiner* — Frank D Ducheneaux
(74) *Attorney, Agent, or Firm* — Wenderoth, Lind & Ponack, L.L.P.

(57) ABSTRACT

The present invention aims to provide an adhesive composition having excellent adhesive property and excellent anti-fogging property by way of simple and easy means such as co-extrusion with a substrate film, extrusion coating, solvent coating, etc. According to the present invention, there is provided an adhesive composition, characterized in that it contains a polyester resin (A) and an anti-fogging agent (C), and satisfies the following requirement (1):

(1) Glass transition temperature of the polyester resin (A) is from −30 to 30° C.

8 Claims, No Drawings

ADHESIVE COMPOSITION HAVING ANTI-FOGGING PROPERTY

TECHNICAL FIELD OF THE INVENTION

The present invention relates to an adhesive composition having both adhesive property and anti-fogging property. To be more specific, it relates to an adhesive composition used for adhesion of a thermoplastic resin film to a packaging container. More particularly, it relates to an adhesive composition for a covering material of a food packaging container.

BACKGROUND ART

In recent years, a polyester container being excellent in transparency and recycling property has been widely used as a packaging material for perishable foods such as vegetables and fruits. The container as such can extend a "best-before" date of the perishable foods by making them into a completely sealed state. Accordingly, it has been receiving public attention as one of candidates of distribution revolution of foods. As a result, anti-fogging property has been demanded for a covering material of the packaging material for enhancing visibility of its content. That is because, when fogging is resulted on an inner surface of the packaging material due to evaporation of moisture from the perishable foods in the container, the content is hardly visible and accordingly commercial value lowers. In addition, a sure sealing property until the content is taken out is demanded as an essential requirement for the covering material of the container.

As a method for forming an adhesive composition having anti-fogging property, there have been proposed a method wherein an anti-fogging agent is melted with and kneaded into a resin followed by shaping into a film, and a method wherein a resin is shaped into a film and then an anti-fogging agent is applied to a side of the resulting film which contacts the content. However, in the former method wherein the anti-fogging agent is kneaded into the resin, there is a problem that an effect of the anti-fogging agent is not constant and the effect has no durability. This is because the anti-fogging agent is apt to transfer in the multi-laminated film. Moreover, there is another problem that the anti-fogging agent transfers to a layer being adjacent to an anti-fogging agent-containing layer whereby tight adhesion between the layers is affected resulting in layer detachment.

For example, in Patent Document 1, there is proposed a multi-laminated film having at least four layers prepared by laminating an olefin-type resin and a polyester-type resin, wherein a layer into which the anti-fogging agent is kneaded is selected and, at the same time, a surface treatment of the multi-laminated film is appropriately conducted.

Further, in Patent Document 2, there is proposed a method wherein a resin is shaped into a film and then an anti-fogging agent is coated to a side of the resulting film which contacts the content.

PRIOR ART DOCUMENTS

Patent Documents

Patent Document 1: Japanese Patent No. 5804339
Patent Document 2: Japanese Patent Application Laid-Open (JP-A) No. 2004-25825

DISCLOSURE OF THE INVENTION

Problem that the Invention is to Solve

In Patent Document 1, film is formed by a specific machine wherein the anti-fogging agent is kneaded by means of melt kneading and a multilayer co-extrusion is done followed by conducting the surface treatment. Therefore, it is difficult to easily form an adhesive layer in a thin film. In addition, in Patent Document 2, a coating liquid containing the anti-fogging agent is coated onto the film surface. Accordingly, a step for drying the coating is necessary, and thus productivity is low. Moreover, the anti-fogging agent on the coated surface is flown out due to evaporation of moisture from the content whereby durability of the anti-fogging effect lowers.

The present inventors conducted intensive investigations for solving the above problems. As a result, they found that an adhesive composition having a specific physical property exhibits excellent adhesive property and excellent anti-fogging property without causing a decrease in the adhesive property and anti-fogging property by transfer of the anti-fogging agent whereupon the present invention has been achieved.

Thus, an object of the present invention is to provide an adhesive composition having excellent adhesive property and excellent anti-fogging property by way of simple and easy means such as co-extrusion with a substrate film, extrusion coating, solvent coating, etc.

Means for Solving the Problem

The present invention relates to an adhesive composition, characterized in that it contains a polyester resin (A) and an anti-fogging agent (C), and satisfies the following requirement (1):

(1) Glass transition temperature of the polyester resin (A) is from −30 to 30° C.

It is preferred that the above adhesive composition further contains a polyester resin (B), and satisfies the following requirement (2):

(2) Glass transition temperature of the polyester resin (B) is from 40 to 90° C.

It is preferred that the anti-fogging agent (C) is a nonionic surfactant.

It is preferred that the above adhesive composition contains 0.1 to 50 part(s) by mass of the anti-fogging agent (C) and 10 to 150 parts by mass of the polyester resin (B) to 100 parts by mass of the polyester resin (A).

The present invention also relates to a laminated film, characterized in that it is prepared by laminating an adhesive layer constituted from the above adhesive composition and a thermoplastic resin film.

It is preferred that the thermoplastic film is a polyester-type resin film and a thickness of the adhesive layer is from 1 to 10 μm.

The present invention also relates to a packaging material, characterized in that it comprises the above laminated film as a constituting member; a covering material for a food packaging container, characterized in that it comprises the above packaging material as a constituting member; and a food packaging container, characterized in that it is prepared by laminating the above covering material and a polyester-type resin.

Advantages of the Invention

The adhesive composition and the laminated film using the same in accordance with the present invention exhibit excellent adhesive property to the substrate when they are used in the covering material for the packaging container, and being subjected to a heat sealing. Moreover, due to good anti-fogging property thereof, they can be advantageously used as the packaging materials for the perishable foods, etc.

BEST MODE FOR CARRYING OUT THE INVENTION

Hereinafter, embodiments of the present invention will be illustrated in detail.

The adhesive composition in accordance with the present invention contains the following components (A) and (C). Since it contains the components (A) and (C), excellent adhesive property and excellent anti-fogging property can be achieved. As a result of further containing the component (B), excellent anti-blocking property also can be achieved. Hereinafter, the components (A) to (C) will be illustrated.

Component (A): Polyester Resin (A)

It is preferred that the polyester resin (A) used in the present invention is a polyester having such a chemical structure obtained by polycondensation of a carboxylic acid component consisting of a polyvalent carboxylic acid compound and an alcohol component consisting of a polyhydric alcohol compound, or a polyester obtained by copolymerization of a hydroxycarboxylic acid and a lactone. In the case of the former polyester having such a chemical structure obtained by polycondensation of a carboxylic acid component consisting of a polyvalent carboxylic acid compound and an alcohol component consisting of a polyhydric alcohol compound, it is preferred to be a copolymerized polyester resin wherein at least one of the polyvalent carboxylic acid and the polyhydric alcohol compound comprises two or more components. It is also preferred that the polyester obtained by polycondensation of the polyvalent carboxylic acid compound and the polyhydric alcohol compound is a copolymerized polyester resin mainly consisting of a dicarboxylic acid component and a glycol component. Here, the term reading "mainly" means that a sum of the dicarboxylic acid component and the glycol component in terms of mol occupies 100% by mol or more to a sum (200% by mol) of total acid components and total alcohol components constituting the polyester resin (A) used in the present invention. The sum of the dicarboxylic component and the glycol component is preferred to be 140% by mol or more, more preferred to be 170% by mol or more, and furthermore preferred to be 190% by mol or more and, even if it is 200% by mol, that is acceptable.

As to the dicarboxylic acid, an aromatic dicarboxylic acid or an aliphatic dicarboxylic acid is preferable. Among them, the aromatic dicarboxylic acid is more preferable. When a sum of the carboxylic acid component is 100% by mol, a copolymerizing amount of the aromatic dicarboxylic acid component is preferred to be 40% by mol or more, more preferred to be 45% by mol or more, furthermore preferred to be 50% by mol or more, and particularly preferred to be 55% by mol or more. When it is less than 40% by mol, there may be a case wherein mechanical strength of the resulting coat becomes low and such a case is of no practical use. Even 100% by mol is acceptable. However, it is preferred to be 95% by mol or less, and more preferred to be 90% by mol or less. Preferably, the dicarboxylic acid component is composed of the aromatic dicarboxylic acid and the aliphatic dicarboxylic acid only.

When the aromatic acid and the aliphatic dicarboxylic acid are used together, their ratio (molar ratio) in terms of aromatic dicarboxylic acid:aliphatic dicarboxylic acid is preferred to be 99:1 to 50:50, more preferred to be 95:5 to 55:45, and furthermore preferred to be 90:10 to 60:40.

As to the aromatic dicarboxylic acid, specific examples thereof are terephthalic acid, isophthalic acid, orthophthalic acid and naphthalenedicarboxylic acid although they are non-limitative. As to the aliphatic dicarboxylic acid, specific examples thereof are succinic acid, adipic acid, azelaic acid, sebacic acid and dodecanedicarboxylic acid although they are non-limitative. Each of those dicarboxylic acid components may be used solely or two or more thereof may be used jointly. As to other polyvalent carboxylic acid components, it is also possible to use an aromatic oxycarboxylic acid such as p-oxybenzoic acid or p-(hydroxyethoxy)benzoic acid; an unsaturated alicyclic dicarboxylic acid such as fumaric acid, maleic acid, itaconic acid, hexahydrophthalic acid or tetrahydrophthalic acid; an alicyclic dicarboxylic acid such as 1,2-cyclohexane-dicarboxylic acid, 1,3-cyclohexanedicarboxylic acid or 1,4-cyclohexanedicarboxylic acid; and the like. If necessary, it is also possible to contain a tri- or tetracarboxylic acid such as trimellitic acid, trimesic acid or pyromellitic acid as well as an anhydride thereof, etc.

As to the glycol component, an aliphatic glycol is preferable. When a sum of the glycol component is 100% by mol, a copolymerizing amount of the aliphatic glycol component is preferred to be 70% by mol or more, more preferred to be 75% by mol or more, furthermore preferred to be 80% by mol or more, and particularly preferred to be 90% by mol or more and, even if it is 100% by mol, that is acceptable. When it is less than 70% by mol, there may be a case wherein glass transition temperature (hereinafter, it may also be referred to as Tg) of the resulting coat becomes high, and thus the coat is unsuitable for the use as an adhesive.

As to the aliphatic glycol, specific examples thereof are ethylene glycol, propylene glycol, 1,3-propanediol, 2,2-dimethyl-1,3-propanediol, 2-methyl-1,3-propanediol (hereinafter, it may also be referred to as 2MG), 1,4-butanediol, 1,5-pentanediol, 1,6-hexanediol, 3-methyl-1,5-pentanediol, diethylene glycol, triethylene glycol, dipropylene glycol, polyethylene glycol, polypropylene glycol and polytetramethylene glycol although they are non-limitative. Each of those glycol components may be used solely or two or more thereof may be used jointly. As to other glycols, it is also possible to use 1,2-cyclohexanedimethanol, 1,3-cyclohexanedimethanol, 1,4-cyclohexanedimethanol, tricyclodecanediol, an adduct of bisphenol A to ethylene oxide or to propylene oxide, an adduct of hydrogenated bisphenol A to ethylene oxide or to propylene oxide, and the like. Besides the above, it is also possible to contain small amount of a triol (such as trimethylolethane, trimethylolpropane, glycerol or pentaerythritol) and a tetraol if necessary.

As to a method for producing the polyester resin (A), it is possible to adopt a known method. For example, the above dicarboxylic acid component and glycol component are esterified at 150 to 250° C. and then subjected to polycondensation in vacuo at 230 to 300° C. whereupon the aimed polyester resin can be prepared. Incidentally, in case a hydrophilic polar group is to be introduced, it is preferred to add a univalent inorganic salt such as sodium acetate or potassium acetate as a stabilizer for polymerization. It is also possible that a compound such as a hindered phenol or hindered amine type is added thereto as a heat stabilizer.

Glass transition temperature of the polyester resin (A) is from −30 to 30° C., preferably from −25 to 25° C., and more preferably from −20 to 20° C. When the glass transition temperature is lower than the above, blocking may be generated if the laminated film is wound into a roll. When the glass transition temperature is higher than the above, flexibility of the resin may not be achieved upon peeling-off at room temperature whereby the adhesive property may lower.

Preferably, the polyester resin (A) is an amorphous polyester resin. However, when the glass transition temperature is within the above range, the polyester resin (A) may also be a crystalline polyester resin. In the case of the crystalline resin, its melting point is preferred to be 200° C. or lower, more preferred to be 180° C. or lower, and furthermore preferred to be 160° C. or lower. When the melting point is higher than 200° C., good laminating property may not be achieved upon lamination.

The crystalline polyester resin in the present invention stands for such a polyester resin which shows a clear melting peak during a temperature-raising process when the temperature is raised from −100° C. to 250° C. at a rate of 20° C. per minute using a differential scanning colorimeter (DSC). The amorphous polyester resin in the present invention stands for such a polyester resin which does not show a clear melting peak during a temperature-raising process when the temperature is raised from −100° C. to 250° C. at a rate of 20° C. per minute using a differential scanning colorimeter (DSC).

Reduced viscosity ($\eta$sp/c) of the polyester resin (A) is preferred to be from 0.2 to 1.5 dl/g, more preferred to be from 0.4 to 1.4 dl/g, and furthermore preferred to be from 0.6 to 1.3 dl/g. When it is less than the above value, a cohesive force of the resin may be insufficient and the adhesive property may lower. The reduced viscosity can be freely adjusted by changing a polymerization time, polymerization temperature and degree of vacuum upon polymerization (in the case of a vacuum polymerization) of the polyester. Incidentally, the reduced viscosity is measured by an Ubbelohde viscosity tube under a condition wherein a sample concentration is 0.125 g/25 ml, a solvent used for the measurement is chloroform and a measuring temperature is 25° C.

Acid value of the polyester resin (A) is preferred to be 50 mg KOH/g or lower, more preferred to be 40 mg KOH/g or lower, and furthermore preferred to be 30 mg KOH/g or lower. When it is more than the above value, the cohesive force of the resin may be insufficient and the adhesive property may lower. A lower limit of the acid value is not particularly limited and may be even 0 mg KOH/g. It is preferred to be 0.1 mg KOH/g or more, and more preferred to be 0.5 mg KOH/g or more.

Number-average molecular weight (Mn) of the polyester resin (A) is preferred to be from 5000 to 40000, more preferred to be from 10000 to 35000, and furthermore preferred to be from 15000 to 30000. When it is less than the above value, the cohesive force of the resin may be insufficient and the adhesive property may lower. The number-average molecular weight can be freely adjusted by changing the polymerization time, polymerization temperature and degree of vacuum upon polymerization (in the case of a vacuum polymerization) of the polyester. Incidentally, the number-average molecular weight is measured by gel permeation chromatography (hereinafter it will be referred to as GPC) under a condition wherein a standard substance is a polystyrene resin and a mobile phase is tetrahydrofuran or chloroform.

A rate of the polyester resin (A) contained in the adhesive composition is preferred to be from 40 to 99% by mass, more preferred to be from 60 to 95% by mass, and furthermore preferred to be from 70 to 90% by mass to a solid in the adhesive composition. When it is more than the above value, the blocking may be generated if the laminated film is wound into a roll. When it is less than the above value, flexibility of the resin may not be achieved upon the peeling-off at room temperature whereby the adhesive property may lower.

When the polyester resin (A) is a polyester resin which has the glass transition temperature within the above range, it may be used either solely or two or more kinds thereof may be used jointly.

Component (B): Polyester Resin (B)

When the polyester resin (B) is compounded with the adhesive composition of the present invention, it is now possible that not only adhesive property and anti-fogging property but also excellent anti-blocking property can be achieved. In other words, when a laminated film prepared by laminating an adhesive layer consisting of the adhesive composition onto a substrate film is wound into a roll, the excellent anti-blocking property can be achieved.

Similar to the above polyester resin (A), it is preferred that the polyester resin (B) used in the present invention is a polyester having such a chemical structure obtained by polycondensation of a carboxylic acid component consisting of a polyvalent carboxylic acid compound and an alcohol component consisting of a polyhydric alcohol compound, or a polyester obtained by copolymerization of a hydroxycarboxylic acid and a lactone. In the case of the former polyester having such a chemical structure obtained by polycondensation of a carboxylic acid component consisting of a polyvalent carboxylic acid compound and an alcohol component consisting of a polyhydric alcohol compound, it is preferred to be a copolymerized polyester resin wherein at least one of the polyvalent carboxylic acid and the polyhydric alcohol compound comprises two or more components. It is also preferred that the polyester obtained by polycondensation of the polyvalent carboxylic acid compound and the polyhydric alcohol compound is a copolymerized polyester resin mainly consisting of a dicarboxylic acid component and a glycol component. Here, the term reading "mainly" means that a sum of the dicarboxylic acid component and the glycol component in terms of mol occupies 100% by mol or more to a sum (200% by mol) of total acid components and total alcohol components constituting the polyester resin (B) used in the present invention. The sum of the dicarboxylic component and the glycol component is preferred to be 140% by mol or more, more preferred to be 170% by mol or more, and furthermore preferred to be 190% by mol or more and, even if it is 200% by mol, that is acceptable.

As to a method for producing the polyester resin (B), it is possible to adopt a known method similar to the above polyester resin (A). For example, the above dicarboxylic acid component and glycol component are esterified at 150 to 250° C. and then subjected to polycondensation in vacuo at 230 to 300° C. whereupon the aimed polyester resin can be prepared. Incidentally, in case a hydrophilic polar group is to be introduced, it is preferred to add a univalent inorganic salt such as sodium acetate or potassium acetate as a stabilizer for polymerization. It is also possible that a compound such as a hindered phenol or hindered amine type is added thereto as a heat stabilizer.

Glass transition temperature of the polyester resin (B) is from 40 to 90° C., preferably from 45 to 85° C., and more preferably from 50 to 80° C. When the glass transition temperature is lower than the above, blocking may be generated if the laminated film is wound into a roll. When the glass transition temperature is higher than the above, the laminated film may not be melted at the heat seal temperature whereby the adhesive property may lower.

Reduced viscosity ($\eta sp/c$) of the polyester resin (B) is preferred to be from 0.1 to 1.0 dl/g, more preferred to be from 0.2 to 0.9 dl/g, and furthermore preferred to be from 0.3 to 0.7 dl/g. When it is less than the above value, mechanical properties may be insufficient and the anti-blocking property may lower. The reduced viscosity can be freely adjusted by changing a polymerization time, polymerization temperature and degree of vacuum upon polymerization (in the case of a vacuum polymerization) of the polyester. Incidentally, the reduced viscosity is measured by an Ubbelohde viscosity tube under a condition wherein a sample concentration is 0.125 g/25 ml, a solvent used for the measurement is chloroform and a measuring temperature is 25° C.

Acid value of the polyester resin (B) is preferred to be 50 mg KOH/g or lower, more preferred to be 40 mg KOH/g or lower, and furthermore preferred to be 30 mg KOH/g or lower. When it is more than the above value, the cohesive force of the resin may be insufficient and the adhesive property may lower. A lower limit of the acid value is not particularly limited and may be even 0 mg KOH/g. It is preferred to be 0.1 mg KOH/g or more, and more preferred to be 0.5 mg KOH/g or more.

Number-average molecular weight (Mn) of the polyester resin (B) is preferred to be from 2000 to 35000, more preferred to be from 5000 to 30000, and furthermore preferred to be from 10000 to 25000. When it is less than the above value, the mechanical properties may be insufficient and the anti-blocking property may lower. The number-average molecular weight can be freely adjusted by changing the polymerization time, polymerization temperature and degree of vacuum upon polymerization (in the case of a vacuum polymerization) of the polyester. Incidentally, the number-average molecular weight is measured by gel permeation chromatography (hereinafter it will be referred to as GPC) under a condition wherein a standard substance is a polystyrene resin and a mobile phase is tetrahydrofuran or chloroform.

A rate of the polyester resin (B) contained in the adhesive composition is preferred to be from 10 to 150 parts by mass, more preferred to be from 18 to 120 parts by mass, and furthermore preferred to be from 25 to 100 parts by mass to 100 parts by mass of the polyester resin (A). When it is more than the above value, the blocking may be generated if the laminated film is wound into a roll. When it is less than the above value, flexibility of the resin may not be achieved upon the peeling-off at room temperature whereby the adhesive property may lower.

When the polyester resin (B) is a polyester resin which has the glass transition temperature within the above range, it may be used either solely or two or more kinds thereof may be used jointly.

Component (C): Anti-Fogging Agent (C)

As to the anti-fogging agent (C), there is no particular limitation so far as it can impart the anti-fogging property. For example, an anionic surfactant, nonionic surfactant, cationic surfactant or amphoteric surfactant can be used. Among them, the nonionic surfactant is particularly preferred. The anti-fogging property stands for such a property that, when water is placed in a packaging container and sealed with a covering material, fogging of an inner surface (including the cover material as well) of the packaging material due to evaporation of moisture is prevented. Particularly in the covering material of the packaging container for perishable food such as vegetables or fruits, there may be such a case wherein the content is hardly visible due to evaporation of moisture and accordingly the commercial value lowers. Therefore, an excellent anti-fogging property may become necessary.

As to the anionic surfactant, there are exemplified higher alcohol sulfate salt, higher alkyl sulfonate, higher carboxylate, alkylbenzene sulfonate, polyoxyethylene alkyl sulfate salt, polyoxyethylene alkyl phenyl ether sulfate salt and vinyl sulfosuccinate. As to the nonionic surfactant, there are exemplified a compound having a polyoxyethylene structure (such as polyoxyethylene alkyl ether, polyoxyethylene alkyl phenyl ether, polyethylene glycol fatty acid ester, a block copolymer of ethylene oxide with propylene oxide, polyoxyethylene fatty acid amide and a copolymer of ethylene oxide with propylene oxide) and sorbitan derivatives. As to the cationic surfactant, there are exemplified alkylamine salt, dialkylamine salt, trialkylamine salt, alkyl trimethylammonium chloride, dialkyl dimethylammonium chloride and alkyl benzalkonium chloride. As to the amphoteric surfactant, there are exemplified lauryl betaine and lauryl dimethylamine oxide.

As to the nonionic surfactant, there are specifically exemplified a sorbitan-type surfactant such as sorbitan monostearate, sorbitan distearate, sorbitan monopalmitate, sorbitan dipalmitate, sorbitan monobehenate, sorbitan dibehenate, sorbitan monolaurate or sorbitan dilaurate; a glycerol-type surfactant such as glycerol monolaurate, glycerol dilaurate, diglycerol monopalmitate, diglycerol dipalmitate, glycerol monostearate, glycerol distearate, diglycerol monostearate, diglycerol distearate, diglycerol monolaurate or diglycerol dilaurate; a polyethylene glycol-type surfactant such as polyethylene glycol monostearate or polyethylene glycol monopalmitate; a trimethylolpropane-type surfactant such as trimethylolpropane monostearate; a diethanol alkylamine-type or a diethanol alkylamide-type surfactant such as lauryl diethanolamine, oleyl diethanolamine, stearyl diethanolamine, lauryl diethanolamide, oleyldiethanolamide or stearyl diethanolamide; a pentaerythritol-type surfactant such as pentaerythritol monopalmitate; and polyoxyethylene sorbitan monostearate, polyoxyethylene sorbitan distearate and mono- and distearate of a sorbitan-diglycerol condensate, etc. Each of them may be used solely or two or more thereof may be used jointly.

As to the cationic surfactant, there are specifically exemplified an amine salt such as laurylamine acetate, triethanolamine monoformate or stearamide ethyldiethylamine acetate; and a quaternary ammonium salt such as lauryl trimethylammonium chloride, stearyl trimethylammonium chloride, dilauryl dimethylammonium chloride, distearyl dimethylammonium chloride, lauryl dimethyl benzylammonium chloride or stearyl dimethyl benzylammonium chloride. Each of them may be used solely or two or more thereof may be used jointly.

As to a rate of the anti-fogging agent (C) contained in the adhesive composition, it is preferred to be from 0.1 to 50 part (s) by mass to 100 parts by mass of the polyester resin (A). It is more preferred to be from 0.5 to 38 part(s) by mass, furthermore preferred to be from 1 to 25 parts by mass, particularly preferred to be from 2 to 20 parts by mass, and the most preferred to be from 3 to 15 parts by mass to 100 parts by mass of the polyester resin (A). When the rate is less than the above-mentioned value, an influence on a surface of the adhesive layer may be little and the anti-fogging effect may be insufficient. When it is more than the above-mentioned value, the anti-fogging agent may excessively remain on the surface of the adhesive layer whereby the adhesive property may lower.

Adhesive Composition

The adhesive composition of the present invention contains the above polyester resin (A) and anti-fogging agent (C) as essential components. Preferably, it further contains the polyester resin (B). When the polyester resin (B) is compounded, a compounding ratio (ratio by mass) of the polyester resin (A) to the polyester resin (B) is preferred to be (90 to 40)/(10 to 60), more preferred to be (85 to 45)/(15 to 55), and furthermore preferred to be (80 to 50)/(20 to 50) in terms of (polyester resin (A))/(polyester resin (B)). When the compounding rate of the polyester resin (B) is too small, blocking may be generated when the laminated film is wound into a roll. On the other hand, when the compounding rate of the polyester resin (B) is too large, flexibility of the resin may not be achieved upon peeling-off at room temperature whereby the adhesive property may lower.

As to the polyester resin in the adhesive composition, a total amount of the polyester resin (A) and the polyester resin (B) is preferred to be 80% by mass or more, more preferred to be 90% by mass or more, and furthermore preferred to be 95% by mass or more. Even 100% by mass is acceptable.

When the polyester (B) is compounded, a content of the anti-fogging agent (C) is preferred to be from 0.1 to 20 part(s) by mass, more preferred to be from 0.5 to 15 part(s) by mass, and furthermore preferred to be from 1 to 10 part(s) by mass to 100 parts by mass of the sum of the polyester resin (A) and the polyester (B) in the adhesive composition. When the rate is less than the above-mentioned value, an influence on a surface of the adhesive layer may be little and the anti-fogging effect may be insufficient. When it is more than the above-mentioned value, the anti-fogging agent may excessively remain on the surface of the adhesive layer whereby the adhesive property may lower.

Component (D): Anti-Blocking Agent (D)

The adhesive composition of the present invention may contain an anti-blocking agent (D). As to the anti-blocking agent (D), there are exemplified inorganic particles, organic particles, waxes, etc. The anti-blocking agent (D) may be contained to such an extent that it does not deteriorate the adhesive property and the anti-blocking property. The anti-blocking agent (D) as such may be used solely or two or more thereof may be used jointly. When the anti-blocking agent (D) is contained, its content is preferred to be 0.1 part by mass or more, more preferred to be 0.2 part by mass or more to 100 parts by mass of the polyester resin (A). When it is too small, an effect of the anti-blocking property may not be achieved. The content is preferred to be 5 parts by mass or less, and more preferred to be 3 parts by mass or less. When it is too much, the adhesive property may lower or the transparency may lower.

As to the inorganic particles, there may be exemplified the inorganic particles containing oxide, hydroxide, sulfate, carbonate, silicate or the like of metal such as magnesium, calcium, barium, zinc, zirconium, molybdenum, silicon, antimony or titanium. Among the inorganic particles as such, silica gel particles are particularly preferred. A shape of the particles may be any of powder, particle, granule, plate, needle, etc. and there is no particular limitation therefor.

As to the organic particles, there are exemplified polymer particles such as polymethyl methacrylate resin, polystyrene resin, Nylon resin, melamine resin, benzoguanamine resin, phenol resin, urea resin, silicone resin, methacrylate resin or acrylate resin as well as cellulose powder, nitrocellulose powder, wood powder, wastepaper powder, chaff powder or starch. The polymer particles can be prepared by a polymerizing method such as emulsion polymerization, suspension polymerization, dispersion polymerization, soap-free polymerization or micro-suspension polymerization. The above-mentioned organic particles can be used within such an extent that the effect of the present invention is not deteriorated thereby. A shape of the particles may be any of powder, particle, granule, plate, needle, etc. and there is no particular limitation therefor.

As to the wax, there are specifically exemplified a hydrocarbon-type wax such as liquid paraffin, natural paraffin, micro-wax, synthetic paraffin or polyethylene wax; a fatty acid-type wax such as stearic acid; a fatty acid amide-type wax such as stearic amide, palmitic amide, methylene bis-stearoamide, ethylene bisstearoamide, oleic amide or esilic amide; an ester-type wax such as a lower alcohol ester of fatty acid, a polyhydric alcohol ester of fatty acid or fatty acid polyglycol ester; an alcohol-type wax such as cetyl alcohol or stearyl alcohol; an olefin-type wax; a natural wax such as caster wax or carnauba wax; metal soap derived from fatty acid having 12 to 30 carbons; etc. The above-mentioned wax can be used within such an extent that the effect of the present invention is not deteriorated thereby.

Laminated Film

The laminated film of the present invention is such a film being prepared by laminating an adhesive layer constituted from the adhesive composition of the present invention onto at least one side of the substrate film. The laminated film can be produced by various methods such as co-extrusion of the substrate film and the adhesive composition, extrusion coating or solvent coating.

As to the substrate film, there is no particular limitation therefor so far as the adhesive layer can be formed from the adhesive composition of the present invention. However, a thermoplastic resin film is preferred. There are exemplified polyester-type resin film, polypropylene-type resin film, polyamide-type resin film, polyvinyl alcohol-type resin film and polyvinylidene chloride-type resin film. Among them, a polyester-type resin film is more preferred since it is suitable as the cover material for the food packaging container.

Thickness of the substrate film is preferred to be 5 μm or more, and more preferred to be 10 μm or more. When it is less than the above value, durability of the substrate film may be insufficient. Further, it is preferred to be 50 μm or less, and more preferred to be 30 µm or less. When it is more than the above value, there is a possibility that the laminated film is not practically used as the covering material for the food packaging container.

In the case of the solvent coating, there is particular limitation for a solvent which dissolves the adhesive composition of the present invention. The solvent can be freely selected taking solubility, volatility, drying rate, leveling property, load on environment, etc. into consideration. As to an organic solvent, there are exemplified an aromatic hydrocarbon solvent such as toluene, xylene or Solvesso; an ester-type solvent such as ethyl acetate, propyl acetate, isopropyl acetate, butyl acetate or isobutyl acetate; a ketone-type solvent such as acetone, methyl ethyl ketone (hereinafter, it will be also referred to as MEK) or cyclohexanone; an alcohol-type solvent such as methanol, ethanol, n-propanol, isopropanol, n-butanol or isobutanol; a glycol ether-type solvent such as ethylene glycol monomethyl ether, ethylene glycol monoethyl ether, ethylene glycol monobutyl ether or propylene glycol monomethyl ether; a glycol ether ester-type solvent wherein the above is made into an acetyl ester; a lactate-type solvent such as ethyl lactate or methyl lactate; etc. One of the above solvents or two or more thereof may be used.

When a solution of the adhesive composition in the organic solvent is coated (applied) onto the substrate film followed by drying, the laminated film can be obtained. Thickness of the adhesive layer is preferred to be 1 µm or more, and more preferred to be 2 µm or more. When it is less than the above value, the adhesive property may be insufficient. The thickness is preferred to be 10 µm or less, and preferred to be 5 µm or less. When it is more than the above value, the heat sealing property may lower.

Since the laminated film of the present invention is excellent in the adhesive property and anti-fogging property, it is suitable as a constituting component for the packaging material. It is particularly suitable as the covering material of food packaging container for perishable foods, etc. When it is used as the covering material for food packaging container, the content can be tightly sealed when a side of the adhesive layer in the laminated film and the food packaging container are laminated. Although there is no particular limitation for a material of the food packaging container, it is preferred to be a polyester-type resin.

EXAMPLES

The present invention will now be illustrated in more detail by referring to Examples although the present invention is not limited thereto. The term simply reading "part (s)" in Examples and Comparative Examples stands for "part (s) by mass".

(Methods for Evaluating Physical Properties)

Melting Point of Crystals and Glass Transition Temperature

A sample (polyester resin (A) or polyester resin (B)) (5 mg) was tightly sealed in a container of an aluminum pushing cover type using a differential scanning calorimetric analysis meter (DSC) (DSC-220 manufactured by Seiko Instruments). Measurement was conducted at a temperature-raising rate of 20° C. per minute from −100° C. to 250° C. and the highest peak temperature of heat of fusion was determined as a melting point of crystals. Further, glass transition temperature was determined by a temperature at a crossing point of an extended line of a base line being lower than the glass transition temperature with a tangent showing the highest inclination between an initial part of the peak and a top of the peak, using the above measuring device under the same condition.

Preparation of Laminated Film for Evaluation

The adhesive composition prepared in Examples and Comparative Examples were coated to a corona-treated surface of a polyester film (E 5107 manufactured by Toyobo) of 25 µm thickness so that a thickness after drying was made 3 g/cm$^2$. After that, it was dried at 160° C. for 30 seconds to give a laminated film for evaluation.

(1) Peeling Strength (Adhesiveness)

A side of the adhesive layer of the laminated film for evaluation was heat-sealed to an amorphous polyester sheet (A-PET sheet manufactured by Toyobo) of 350 µm thickness at 130° C. temperature and 2.8 kgf/cm$^2$ pressure for 1 second. After that, a test piece of 25 mm width was cut out therefrom and subjected to a 180° peeling test at 25° C. with a tensile speed of 100 mm per minute whereupon the peeling strength was measured.

Evaluating Criteria

∘∘: 1000 gf/25 mm or more

∘: 800 gf/25 mm or more and less than 1000 gf/25 mm

Δ: 500 gf/25 mm or more and less than 800 gf/25 mm x: less than 500 gf/25 mm (2) Anti-Fogging Property at 60° C.

Water of 60° C. (30 ml) was charged in a container of 70 cm$^3$ volume. The side of the adhesive layer of the laminated film was placed on a mouth of the container followed by covering with a rubber band. After that, it was stored for one hour in a constant-temperature bath of 60° C. The anti-fogging effect was confirmed by naked eye according to the following judging criteria.

Evaluating Criteria

∘: Continuous water film was formed on a surface of the film and visibility was good.

Δ: Although water drops were partially stuck on the surface of the film, the visibility was good.

x: Water drops were stuck on the surface of the film or the visibility became bad.

(3) Anti-Fogging Property at 5° C.

Water of ordinary temperature (30 ml) was charged in a container of 70 cm$^3$ volume. The side of the adhesive layer of the laminated film was placed on a mouth of the container followed by covering with a rubber band. After that, it was stored for one day in a constant-temperature bath of 5° C. The anti-fogging effect was confirmed by naked eye according to the following judging criteria.

Evaluating Criteria

○: Continuous water film was formed on a surface of the film and visibility was good.
Δ: Although water drops were partially stuck on the surface of the film, the visibility was good.
×: Water drops were stuck on the surface of the film or the visibility became bad.

(4) Anti-Blocking Property

The side of the adhesive layer of the laminated film for evaluation was laid on a surface of the polyester film (E5107 manufactured by Toyobo) being untreated with corona whereupon a test sample was prepared. After that, the sample was stored for one day at 40° C. under a pressure of 0.9 kgf/cm². The anti-blocking property was confirmed according to the following judging criteria.

Evaluating Criteria

○: There was entirely no tack in the test sample.
Δ: Although a slight tack was noted in the test sample, it was within an extent of causing no problem in an actual use.
×: Tack was noted in the test sample and it was within an extent of causing problems in the actual use.

Examples of Polyester Resin (A)

Synthesis of Polyester Resin (A-1)

Into a reactor equipped with a stirrer, thermometer, heating heater, cooling device and cooler for distillation, there were charged 445 parts by mass of terephthalic acid, 74 parts by mass of isophthalic acid, 270 parts by mass of sebacic acid, 277 parts by mass of ethylene glycol, 465 parts by mass of propylene glycol and 0.5 part by mass of tetrabutyl titanate. Temperature was raised up to 230° C. Esterification reaction was conducted during 4 hours. After completion of the transesterification, a reaction system was made vacuum down to 10 torr during 60 minutes together with raising the temperature thereof up to 250° C. After that, the pressure was made into vacuum to an extent of 1 torr or lower and polycondensation was conducted for 60 minutes at 250° C. After that, nitrogen was flown into the reaction system to conduct vacuum break whereby the polycondensation reaction was finished. After finishing the reaction, the resulting polyester resin was taken out and cooled to give the polyester resin (A-1).

Examples of Polyester Resin (B)

Synthesis of Polyester Resin (B-1)

Into a reactor equipped with a stirrer, thermometer, heating heater, cooling device and cooler for distillation, there were charged 455 parts by mass of dimethyl terephthalate, 455 parts by mass of dimethyl isophthalate, 291 parts by mass of ethylene glycol, 488 parts by mass of 2,2-dimethyl-1,3-propanediol and 0.5 part by mass of tetrabutyl titanate. Temperature was raised up to 240° C. Esterification reaction was conducted during 4 hours. After completion of the transesterification, a reaction system was made vacuum down to 10 torr during 60 minutes together with raising the temperature thereof up to 250° C. After that, the pressure was made into vacuum to an extent of 1 torr or lower and polycondensation was conducted for 60 minutes at 250° C. After that, nitrogen was flown into the reaction system to conduct vacuum break whereby the polycondensation reaction was finished. After finishing the reaction, the resulting polyester resin was taken out and cooled to give the polyester resin (B-1).

Synthesis of Polyester Resins (A-2) to (A-5) and (B-2) to (B-4)

Similar to the synthetic example of the polyester resin (A-1), polyester resins (A-2) to (A-5) were synthesized. Similar to the synthetic examples of the polyester resin (B-1), polyester resins (B-2) to (B-4) were synthesized. Results of measurement of the resin properties are shown in Table 1.

TABLE 1

| | | | \multicolumn{9}{c}{polyester resin (% by mol)} | | | | | | | | |
|---|---|---|---|---|---|---|---|---|---|---|---|
| | | | A-1 | A-2 | A-3 | A-4 | A-5 | B-1 | B-2 | B-3 | B-4 |
| components | polyvalent carboxylic acid components | terephthalic acid | 60 | 35 | 45 | 70 | 46 | 50 | 100 | 45 | 30 |
| | | isophthalic acid | 10 | 20 | 15 | | 38 | 50 | | 45 | 70 |
| | | adipic acid | | 45 | | | | | | | |
| | | sebacic acid | 30 | | 40 | 30 | 16 | | | 10 | |
| | polyhydric alcohol components | ethylene glycol | 50 | | 30 | 30 | 75 | 50 | 30 | 50 | |
| | | propylene glycol | | | 70 | 70 | | | | 70 | 50 |
| | | 2,2-dimethyl-1,3-propanediol | 50 | | | | 25 | 50 | | | 50 |
| | | 1,4-butanediol | | 100 | | | | | | | 50 |
| physical property | | η sp/c (dl/g) | 1.0 | 0.9 | 1.0 | 0.6 | 0.8 | 0.6 | 0.6 | 0.6 | 0.4 |
| | | number-average molecular weight Mn | 30000 | 30000 | 30000 | 17000 | 32000 | 17000 | 18000 | 16000 | 12000 |
| | | acid value (mgKOH/g) | 2 | 2 | 1 | 1 | 2 | 2 | 3 | 2 | 2 |
| | | Tg (° C.) | 10 | −20 | −5 | 16 | 32 | 67 | 82 | 47 | 38 |
| | | Tm (° C.) | | 96 | | | | | | | | down to 10 torr during 60 minutes together with raising the temperature thereof up to 250° C. After that, the pressure was made into vacuum to an extent of 1 torr or lower and polycondensation was conducted for 60 minutes at 250° C.

As to the anti-fogging agent (C), nonionic surfactants [Rikemal (registered trade mark) manufactured by Riken Vitamin] DO-100V, A and OL-100E were used.

As to the anti-blocking agent, SYLOID (registered trade mark) C 812 (amorphous silica manufactured by GRACE) was used.

Example 1

Polyester resin (A-1) (80 parts by mass), 20 parts by mass of polyester resin (B-1), 5 parts by mass of the anti-fogging agent (C) and 1 part by mass of the anti-blocking agent were heated/stirred in an MEK solution to prepare an adhesive composition 1. Compounding amount, peeling strength, anti-fogging property and anti-blocking property are shown in Table 2.

Examples 2 to 13

The polyester resin, anti-fogging agent and anti-blocking agent were changed as shown in Table 2 and then Examples 2 to 13 were conducted according to the same method as in Example 1. Peeling strength, anti-fogging property and anti-blocking property are shown in Table 2.

TABLE 2

|  |  |  | Example 1 | Example 2 | Example 3 | Example 4 | Example 5 | Example 6 | Example 7 |
|---|---|---|---|---|---|---|---|---|---|
| polyester resin (A) (parts by mass) | A-1 | (Tg = 10° C.) | 80 | 80 |  |  | 60 | 60 | 80 |
|  | A-2 | (Tg = −20° C.) |  |  | 80 |  |  |  |  |
|  | A-3 | (Tg = −5° C.) |  |  |  |  | 10 |  |  |
|  | A-4 | (Tg = 16° C.) |  |  |  | 80 |  |  |  |
|  | A-5 | (Tg = 32° C.) |  |  |  |  |  |  |  |
| polyester resin (B) (parts by mass) | B-1 | (Tg = 67° C.) | 20 |  |  |  | 30 |  |  |
|  | B-3 | (Tg = 82° C.) |  | 20 |  | 20 |  | 40 |  |
|  | B-4 | (Tg = 47° C.) |  |  | 20 |  |  |  |  |
|  | B-5 | (Tg = 38° C.) |  |  |  |  |  |  | 20 |
| anti-fogging agent (C) (parts by mass) | DO-100V A | | 5 | 5 | 5 | 5 | 5 | 5 | 5 |
|  | OL-100E | |  |  |  |  |  |  |  |
| anti-blocking agent (D) (parts by mass) |  | | 1 | 1 | 1 | 1 | 1 |  | 1 |
| peeling strength | peeling strength [gf/25 mm] | | 1000 | 800 | 1200 | 800 | 680 | 600 | 1200 |
|  | evaluation | | ⊙ | ◯ | ⊙ | ◯ | △ | △ | ⊙ |
| anti-fogging property | anti-fogging property at 60° C. | | ◯ | ◯ | ◯ | ◯ | ◯ | ◯ | ◯ |
|  | anti-fogging property at 5° C. | | ◯ | ◯ | ◯ | ◯ | ◯ | ◯ | ◯ |
| anti-blocking property | evaluation | | ◯ | ◯ | △ | ◯ | ◯ | △ | × |

|  |  |  | Example 8 | Example 9 | Example 10 | Example 11 | Example 12 | Example 13 |
|---|---|---|---|---|---|---|---|---|
| polyester resin (A) (parts by mass) | A-1 | (Tg = 10° C.) | 100 | 80 | 80 | 80 | 80 | 80 |
|  | A-2 | (Tg = −20° C.) |  |  |  |  |  |  |
|  | A-3 | (Tg = −5° C.) |  |  |  |  |  |  |
|  | A-4 | (Tg = 16° C.) |  |  |  |  |  |  |
|  | A-5 | (Tg = 32° C.) |  |  |  |  |  |  |
| polyester resin (B) (parts by mass) | B-1 | (Tg = 67° C.) |  |  |  | 20 | 20 | 20 | 20 |
|  | B-3 | (Tg = 82° C.) |  |  |  |  |  |  |
|  | B-4 | (Tg = 47° C.) |  | 20 |  |  |  |  |
|  | B-5 | (Tg = 38° C.) |  |  |  |  |  |  |
| anti-fogging agent (C) (parts by mass) | DO-100V A | | 5 | 5 | 1 | 20 |  |  |
|  | OL-100E | |  |  |  |  | 5 | 5 |
| anti-blocking agent (D) (parts by mass) |  | | 1 | 1 | 1 | 1 | 1 | 1 |
| peeling strength | peeling strength [gf/25 mm] | | 600 | 1200 | 900 | 600 | 500 | 800 |
|  | evaluation | | ◯ | ⊙ | ◯ | △ | △ | ◯ |

TABLE 2-continued

| | | | | | | | | |
|---|---|---|---|---|---|---|---|---|
| anti-fogging property | anti-fogging property at 60° C. | ○ | ○ | Δ | ○ | ○ | ○ | |
| | anti-fogging property at 5° C. | ○ | ○ | Δ | ○ | ○ | ○ | |
| anti-blocking property | evaluation | x | Δ | ○ | x | ○ | ○ | |

Comparative Examples 1 to 3

The polyester resin, anti-fogging agent and anti-blocking agent were changed as shown in Table 3 and then Comparative Examples 1 to 3 were conducted according to the same method as in Example 1. Peeling strength, anti-fogging property and anti-blocking property are shown in Table 3.

TABLE 3

| | | Comparative Example 1 | Comparative Example 2 | Comparative Example 3 |
|---|---|---|---|---|
| polyester resin (A) (parts by mass) | A-1 (Tg = 10° C.) | | 80 | |
| | A-2 (Tg = −20° C.) | | | |
| | A-3 (Tg = −5° C.) | | | |
| | A-4 (Tg = 16° C.) | | | |
| | A-5 (Tg = 32° C.) | 80 | | |
| polyester resin (B) (parts by mass) | B-1 (Tg = 67° C.) | 20 | 20 | |
| | B-3 (Tg = 82° C.) | | | |
| | B-4 (Tg = 47° C.) | | | 100 |
| | B-5 (Tg = 38° C.) | | | |
| anti-fogging agent (C) (parts by mass) | DO-100V A | 5 | | 5 |
| | OL-100E | | | |
| anti-blocking agent (D) (parts by mass) | | 1 | 1 | 1 |
| peeling strength | peeling strength [gf/25 mm] | 200 | 900 | 200 |
| | evaluation | x | ○ | x |
| anti-fogging property | anti-fogging property at 60° C. | ○ | x | ○ |
| | anti-fogging property at 5° C. | ○ | x | ○ |
| anti-blocking property | evaluation | ○ | ○ | ○ |

As will be clear from Table 2, Examples 1 to 6, 9, 12 and 13 exhibit anti-fogging property and anti-blocking property in spite of the fact that they exhibit excellent adhesive property as an adhesive agent. Further, Examples 7, 8 and 11 exhibit excellent adhesive property and anti-fogging property in spite of the fact that they are inferior in the anti-blocking property. Furthermore, Example 10 exhibits excellent adhesive property and anti-blocking property in spite of the fact that the anti-fogging property lowers. On the contrary, in Comparative Example 1, the polyester resin A exhibits high glass transition temperature whereby the peeling strength is low. In Comparative Example 2, no anti-fogging agent is compounded whereby the anti-fogging property is inferior. In Comparative Example 3, no polyester resin A is compounded whereby the peeling strength is low.

INDUSTRIAL APPLICABILITY

The adhesive composition and the laminated film using the same in accordance with the present invention exhibit excellent adhesive property to the substrate when they are used in the covering material for the packaging container, and being subjected to a heat sealing. They also have anti-blocking property. Moreover, due to good anti-fogging property thereof, they can be advantageously used as the packaging materials for the perishable foods, etc.

The invention claimed is:
1. An adhesive composition, comprising a polyester resin (A), a polyester resin (B), and an anti-fogging agent (C), wherein the polyester resin (A) is a copolymerized polyester resin consisting of a dicarboxylic acid component and a glycol component, wherein the dicarboxylic acid component comprises an aromatic dicarboxylic acid and an aliphatic dicarboxylic acid in a molar ratio in terms of aromatic dicarboxylic acid:aliphatic dicarboxylic acid of 70:30 to 55:45, the polyester resin (A) satisfies the following requirement (1):

(1) Glass transition temperature of the polyester resin (A) is from −30 to 30° C., the polyester resin (B) satisfies the following requirement (2):

(2) Glass transition temperature of the polyester resin (B) is from 40 to 82° C., and the adhesive composition comprises 1 to 5 part(s) by mass of the anti-fogging agent (C) to 100 parts by mass of the polyester resin (A).

2. The adhesive composition according to claim 1, wherein the anti-fogging agent (C) is a nonionic surfactant.

3. A laminated film, which is prepared by laminating an adhesive layer comprising the adhesive composition according to claim 1 and a thermoplastic resin film.

4. The laminated film according to claim 3, wherein the thermoplastic film is a polyester resin film.

5. The laminated film according to claim 3, wherein a thickness of the adhesive layer is from 1 to 10 μm.

6. A packaging material, comprising the laminated film according to claim 5 as a constituting member.

7. A covering material for a food packaging container, comprising the packaging material according to claim 6 as a constituting member.

8. A food packaging container, which is prepared by laminating the covering material according to claim 7 and a polyester resin.

* * * * *

(12) EX PARTE REEXAMINATION CERTIFICATE (225th)
Ex Parte Reexamination Ordered under 35 U.S.C. 257

United States Patent
Mikami et al.

(10) Number: US 11,459,492 C1
(45) Certificate Issued: Jul. 17, 2023

(54) ADHESIVE COMPOSITION HAVING ANTI-FOGGING PROPERTY

(71) Applicant: TOYOBO CO., LTD., Osaka (JP)

(72) Inventors: Tadahiko Mikami, Shiga (JP); Masahito Tanigawa, Shiga (JP)

(73) Assignee: TOYOBO CO., LTD., Osaka (JP)

Supplemental Examination Request:
No. 96/000,423, Feb. 7, 2023

Reexamination Certificate for:
Patent No.: 11,459,492
Issued: Oct. 4, 2022
Appl. No.: 16/466,679
PCT Filed: Jan. 17, 2018
PCT No.: PCT/JP2018/001127
§ 371 (c)(1),
(2) Date: Jun. 5, 2019
PCT Pub. No.: WO2018/179689
PCT Pub. Date: Oct. 4, 2018

(30) Foreign Application Priority Data

Mar. 29, 2017 (JP) .................................. 2017-065332

(51) Int. Cl.
| | | |
|---|---|---|
| C09J 167/00 | (2006.01) | |
| C09J 7/20 | (2018.01) | |
| B65D 65/40 | (2006.01) | |
| C09J 11/06 | (2006.01) | |
| C09J 167/02 | (2006.01) | |
| C09J 7/25 | (2018.01) | |
| C08K 5/06 | (2006.01) | |

(52) U.S. Cl.
CPC ............ *C09J 167/00* (2013.01); *B65D 65/40* (2013.01); *C09J 7/20* (2018.01); *C09J 11/06* (2013.01); *C09J 167/02* (2013.01); *C08K 5/06* (2013.01); *C08L 2205/025* (2013.01); *C09J 7/255* (2018.01); *C09J 2203/00* (2013.01); *C09J 2301/312* (2020.08); *C09J 2301/408* (2020.08); *C09J 2467/00* (2013.01); *C09J 2467/006* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,423, please refer to the USPTO's Patent Electronic System.

*Primary Examiner* — Jerry D Johnson

(57) ABSTRACT

The present invention aims to provide an adhesive composition having excellent adhesive property and excellent anti-fogging property by way of simple and easy means such as co-extrusion with a substrate film, extrusion coating, solvent coating, etc. According to the present invention, there is provided an adhesive composition, characterized in that it contains a polyester resin (A) and an anti-fogging agent (C), and satisfies the following requirement (1):
(1) Glass transition temperature of the polyester resin (A) is from −30 to 30° C.

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-8, dependent on an amended claim, are determined to be patentable.

1. An adhesive composition, comprising a polyester resin (A), a polyester resin (B), and an anti-fogging agent (C), wherein the polyester resin (A) is a copolymerized polyester resin consisting of a dicarboxylic acid component and a glycol component, wherein the dicarboxylic acid component comprises an aromatic dicarboxylic acid and an aliphatic dicarboxylic acid in a molar ratio in terms of aromatic dicarboxylic acid:aliphatic dicarboxylic acid of 70:30 to 55:45,
*wherein the polyester resin (B) has an acid value of 3 mgKOH/g or lower,* the polyester resin (A) satisfies the following requirement (1):
(1) Glass transition temperature of the polyester resin (A) is from −30 to 30° C., the polyester resin (B) satisfies the following requirement (2):
(2) Glass transition temperature of the polyester resin (B) is from 40 to 82° C., and the adhesive composition comprises 1 to 5 part(s) by mass of the anti-fogging agent (C) to 100 parts by mass of the polyester resin (A).

\* \* \* \* \*